United States Patent
Sutton et al.

(10) Patent No.: US 9,090,027 B2
(45) Date of Patent: Jul. 28, 2015

(54) SYSTEM AND METHOD OF CONSTRUCTING COMPOSITE STRUCTURES

(71) Applicant: Bell Helicopter Textron Inc., Fort Worth, TX (US)

(72) Inventors: Drew Sutton, Watauga, TX (US); Loan Thanh Vo, Hurst, TX (US); Frank Bradley Stamps, Colleyville, TX (US); Nolan Phillips, Bedford, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 347 days.

(21) Appl. No.: 13/658,407

(22) Filed: Oct. 23, 2012

(65) Prior Publication Data
US 2014/0109365 A1  Apr. 24, 2014

(51) Int. Cl.
    B21K 3/04      (2006.01)
    B29C 70/30     (2006.01)
    B29C 70/54     (2006.01)
    B29C 37/02     (2006.01)
    B29D 99/00     (2010.01)

(52) U.S. Cl.
    CPC .......... *B29C 70/30* (2013.01); *B29C 37/02* (2013.01); *B29C 70/545* (2013.01); *B29D 99/0025* (2013.01); *Y02T 50/433* (2013.01); *Y10T 29/37* (2015.01); *Y10T 29/49337* (2015.01)

(58) Field of Classification Search
    CPC ...... B29C 70/30; B29C 37/02; B29C 70/545; B29D 99/0025; Y02T 50/433; Y02T 29/37; Y02T 29/49337
    See application file for complete search history.

(56) References Cited

U.S. PATENT DOCUMENTS

| | | | |
|---|---|---|---|
| 4,861,406 A | * | 8/1989 | Baker et al. .................. 156/230 |
| 5,320,494 A | * | 6/1994 | Reinfelder et al. ........... 416/226 |
| 6,263,936 B1 | | 7/2001 | Moore et al. |

(Continued)

FOREIGN PATENT DOCUMENTS

| | | |
|---|---|---|
| EP | 0470901 A1 | 2/1992 |
| EP | 2226186 A1 | 9/2010 |
| EP | 2433782 A1 | 3/2012 |
| WO | 2010055060 A1 | 5/2010 |
| WO | 2012045969 A1 | 4/2012 |

OTHER PUBLICATIONS

Communication from a Counter-Part Application; Extended European Search Report; European Application No. EP 12199364.6; Oct. 9, 2013; 10 pgs.

(Continued)

Primary Examiner — Ryan J Walters
(74) Attorney, Agent, or Firm — Fish & Richardson P.C.

(57) ABSTRACT

A method of constructing a composite component includes at least one of laterally and longitudinally aligning a material strip relative to a concavity of a layup tool, at least one of laterally and longitudinally extending the material strip to a predetermined location relative to the layup tool, wherein the material strip is substantially rectangular, and vertically abutting the material strip to the concavity of the layup tool, wherein the longitudinally extending the material strip includes at least one of (1) measuring a longitudinal distance of the material strip and (2) aligning a longitudinal end of the material strip with a longitudinal distance indicium and wherein the laterally extending the material strip includes at least one of (1) measuring a lateral distance of the material strip and (4) aligning a lateral end of the material strip with a lateral distance indicium.

14 Claims, 8 Drawing Sheets

(56) References Cited

U.S. PATENT DOCUMENTS

| | | |
|---|---|---|
| 6,659,722 B2 | 12/2003 | Sehgal et al. |
| 2009/0148647 A1 | 6/2009 | Jones et al. |
| 2010/0266416 A1 | 10/2010 | Marshall et al. |
| 2011/0277929 A1* | 11/2011 | Borsting et al. .............. 156/250 |

OTHER PUBLICATIONS

Communication from a Counter-Part Application; Partial European Search Report; European Application No. EP 12199364.6; Jul. 2, 2013; 5 pgs.

* cited by examiner

SYSTEM AND METHOD OF CONSTRUCTING COMPOSITE STRUCTURES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Creating composite structures, such as composite helicopter rotor blades, sometime requires a costly and time consuming process comprising predetermining appropriate dimensions of a material ply and/or stack of material plies for application to a layup tool. In some cases, the predetermining appropriate dimensions for a material ply and/or stack of material plies comprises converting a complex three-dimensional surface area into an appropriately shaped and sized flat pattern. A material ply and/or a stack of material plies sized and shaped in accordance with the flat pattern may be configured to overlay the entirety of the complex three-dimensional surface area when appropriately oriented relative to the layup tool and when in continuous abutment with the complex three-dimensional surface area of the layup tool. Subsequently applied material plies and/or stacks of material plies may further be sized and shaped relative to previously applied material plies and/or stacks of material plies in addition to the complex three-dimensional surface area of the layup tool. In some cases, placing the material plies and/or stacks of material plies comprising the above-described flat patterns may require the use of a laser projection tool configured to project a perimeter outline of a material ply and/or stack of material plies onto the layup tool and/or already applied material plies and/or stacks of material plies. Generating flat patterns and enabling the display of laser projections onto a layup tool requires equipment and equipment programming time that may prevent quick and/or inexpensive blade construction.

SUMMARY

In some embodiments of the disclosure, a method of constructing a composite component is provided that comprises at least one of laterally and longitudinally aligning a material strip relative to a concavity of a layup tool, at least one of laterally and longitudinally extending the material strip to a predetermined location relative to the layup tool, wherein the material strip is substantially rectangular, and vertically abutting the material strip to the concavity of the layup tool, wherein the longitudinally extending the material strip comprises at least one of (1) measuring a longitudinal distance of the material strip and (2) aligning a longitudinal end of the material strip with a longitudinal distance indicium and wherein the laterally extending the material strip comprises at least one of (1) measuring a lateral distance of the material strip and (4) aligning a lateral end of the material strip with a lateral distance indicium.

In other embodiments of the disclosure, a method of constructing a composite component is provided that comprises creating a first layup tool having a first concavity having a surface representative of a first exterior surface of the composite blade, at least partially filling the first concavity with a plurality of first material strips, the first material strips being placed into position relative to the first layup tool without projecting a visual representation of the first material strips onto the first layup tool, and machining the first material strips to form a first mating interface.

In yet other embodiments of the disclosure, a composite blade construction system is provided that comprises a first layup tool comprising a first concavity, a second layup tool comprising a second concavity, and a router configured to selectively remove material extending from within the first concavity along a first parting surface profile and the router being configured to selectively remove material extending from within the second concavity along a second parting surface profile that is complementary to the first parting surface profile.

In still other embodiments of the disclosure, a composite blade is disclosed as comprising a first composite structure defining a first exterior surface of the composite blade and a second composite structure defining a second exterior surface of the composite blade, wherein at least one of the first composite structure and the second composite structure comprise a mating interface comprising a tolerance defined by a single machining apparatus.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases, it may be desirable to provide a composite construction system configured to allow construction of a composite structure, such as a composite blade and/or an aerodynamic faring for a composite blade, without requiring the use of precut material plies and/or stacks of precut material plies. In some embodiments of the disclosure, a composite construction system is disclosed that comprises a layup tool, one or more material strips cut from one or more material rolls, and a router.

Figure 1:
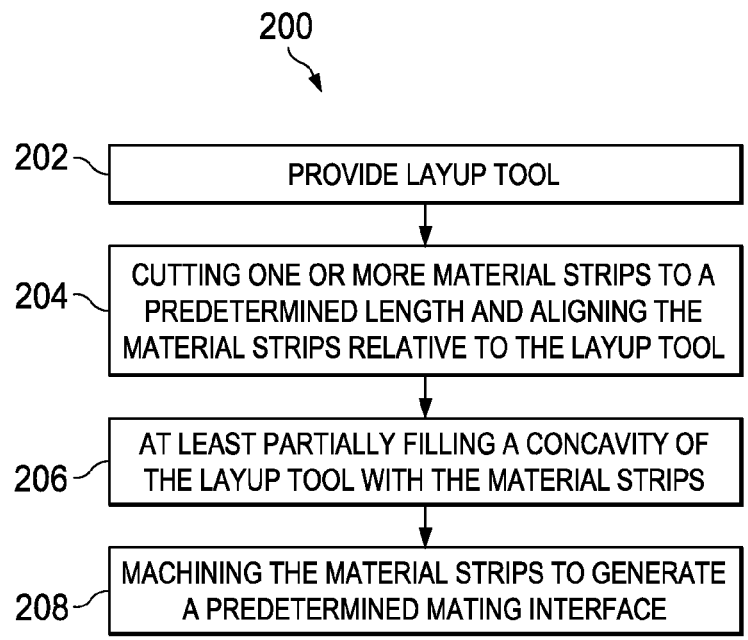
FIG. 1 is a flowchart of a method of constructing a composite component according to an embodiment of the disclosure.

Referring now to FIG. 1, in some embodiments, the composite construction system may be utilized according to a method 200 of constructing a composite component. The method 200 may begin at block 202 by providing a layup tool. The method 200 may continue at block 204 by drawing one or more material strips from one or more material rolls, cutting the material strips to predetermined lengths and/or dispensing material from a material roll until aligned with a predetermined location relative to the layup tool and then cutting the material strip. The method 200 may continue at block 206 by at least partially filling a concavity of the layup tool with the material strips. The method 200 may continue at block 208 by machining the material strips using a router configured to generate a predetermined mating interface. The above-described method 200 may be repeated for one or more additional layup tools, thereby reducing a number of internal tolerance variables and associating the tolerance variables with internal mating surfaces. The composite components generated through the use of each of the layup tools may be selectively joined together to form a combined composite structure.

Figure 2A:
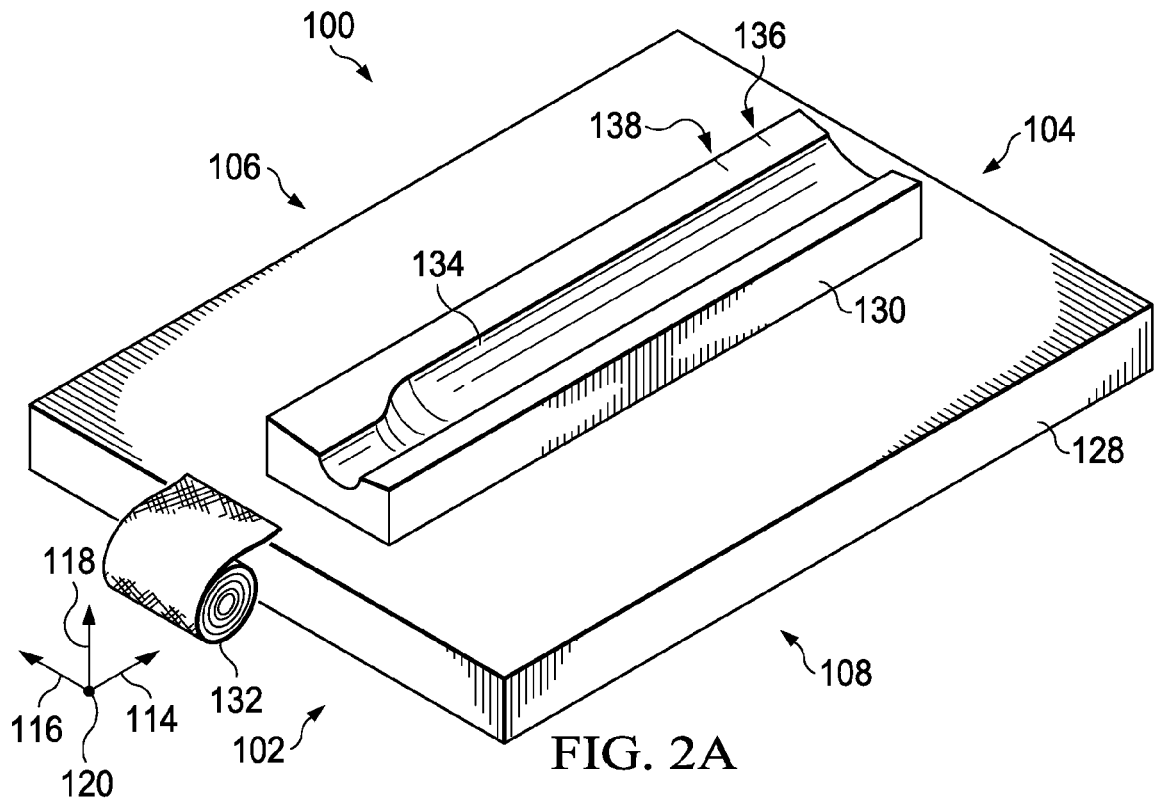
FIG. 2A is an oblique front-top-right view of a composite construction system according to an embodiment of the disclosure.
Figure 2B:
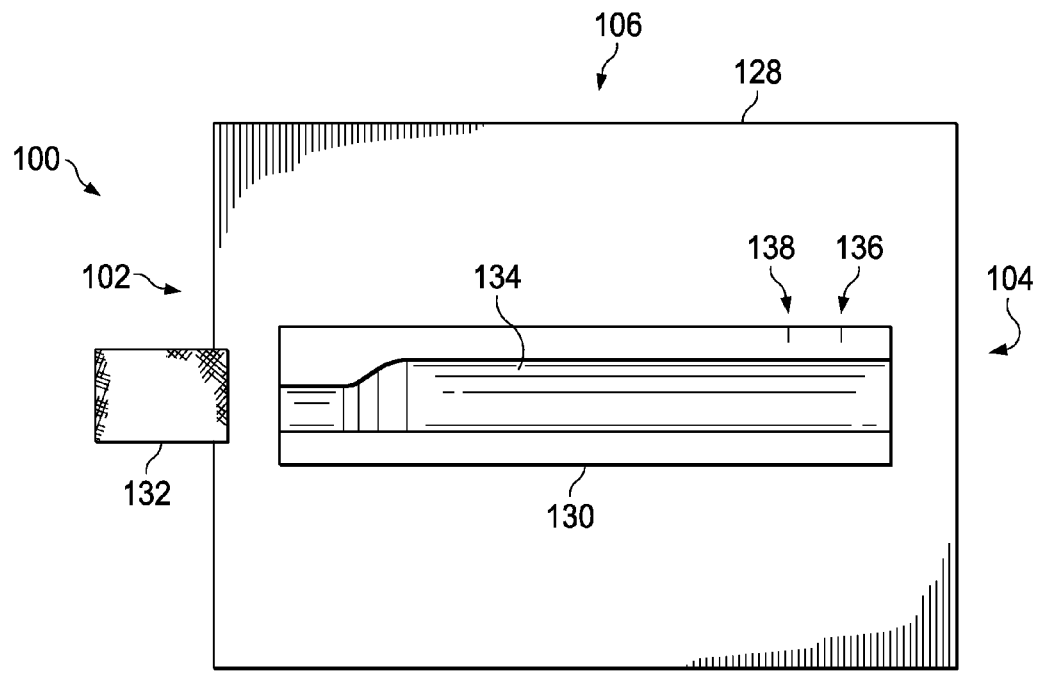
FIG. 2B is an orthogonal top view of the composite construction system of FIG. 2A.

Referring to FIGS. 2A and 2B an oblique front-top-right view and an orthogonal top view of a composite construction system (CCS) 100 according to an embodiment of the disclosure are shown, respectively. The CCS 100 may be described as generally comprising a front 102, rear 104, left 106, right 108, top 110 (see FIGS. 9, 11, and 13), and bottom 112 (see FIGS. 9, 11, and 13) and the following description and associated drawings may generally utilize directional indications to assist in identifying the directional orientation of the CCS 100 and/or components of the CCS 100 without the requirement that such an indication is an absolute identification of a directional extent of the CCS 100. In other words, the above-described directional indications are intended to generally clarify orientations of the components of the CCS 100 relative to each other and to provide context to the associated figures, not to limit the claims. The same directional indicators are utilized in the discussion and associated figures that comprise the CCS 100, components of the CCS 100, and/or composite components created using the CCS 100 to provide a consistent frame of reference throughout the disclosure.

The CCS 100 further comprises a longitudinal axis 114, a lateral axis 116, and a vertical axis 118. The longitudinal axis 114 generally extends longitudinally in a front-rear direction relative to the CCS 100 and in some embodiments may be associated with a longitudinal (spanwise) direction of the CCS 100 and/or a composite structure constructed using the CCS 100. The lateral axis 116 generally extends laterally in a left-right direction relative to the CCS 100 and in some embodiments may be associated with a lateral (chordwise) direction of the CCS 100 and/or a composite structure constructed using the CCS 100. The vertical axis 118 generally extends vertically in a top-bottom direction relative to the CCS 100. The longitudinal axis 114, lateral axis 116, and vertical axis 118 intersect each other at an origin 120 and may generally be described as defining a three dimensional Cartesian coordinate system. The CCS 100 further comprises a lateral bisection plane 122 (see FIGS. 3-9), a longitudinal bisection plane, and a vertical bisection plane 126 (see FIGS. 9 and 11). The lateral bisection plane 122 is generally coincident with the longitudinal axis 114 and the vertical axis 118. The longitudinal bisection plane is generally coincident with the lateral axis 116 and the vertical axis 118. The vertical bisection plane 126 is generally coincident with the lateral axis 116 and longitudinal axis 114.

While the axes 114, 116, and 118 and bisection planes are generally defined to reflect a specific location of the origin 120 relative to the CCS 100 and the orientation of the axes 114, 116, and 118 relative to the CCS 100, they may be described differently without impact to the functionality of the CCS 100 and/or the components of the CCS 100 disclosed herein. In other words, unless otherwise noted herein, the defined orientations of the axes 114, 116, and 118 and bisection planes are provided as a frame of reference against which the CCS 100 and the components of the CCS 100 may be consistently described.

Still referring to FIGS. 2A and 2B, the CCS 100 comprises a vacuum table 128, a first layup tool 130, and a first material roll 132. The first layup tool 130 comprises a first concavity 134, a first longitudinal distance indicium 136, and a second longitudinal distance indicium 138. The first layup tool 130 may generally comprise a steel block of material into which the first concavity 134 is formed on at least the top side of the first layup tool 130. In this embodiment, the first concavity 134 extends along the entire longitudinal length of the first layup tool 130 and may be referred to as additionally being formed in each of the front side and rear side of the first layup tool 130. In some embodiments, the first concavity 134 may be formed by machining the steel block of material using a 5-axis cutting machine that is capable of generating complex surface geometries sufficient for representing an exterior of an aircraft blade and/or an aerodynamic faring for an aircraft blade. In some embodiments, the first material roll 132 may comprise a prepregnated fiber composite material having a semi-structural woven and/or directional fibrous component substantially enveloped in a flexible substrate that is hardenable via a curing process. In some embodiments, the first material roll 132 may comprise an adhesive property on one or both of the top and bottom sides. The first material roll 132 may comprise a lateral width greater than a maximum lateral width of the first concavity 134 but less than a lateral width of the first layup tool 130.

In some embodiments, a method of constructing a first composite component 166 (see FIGS. 12 and 13) may begin by forming the first concavity 134 in a bulk of material to create the first layup tool 130. In this embodiment, the material may be shaped substantially as a box-like structure and may comprise steel. However, in alternative embodiments, the bulk of material may comprise any other suitable machinable and/or moldable material structurally capable of maintaining a desired first concavity 134 surface. Next, the first layup tool 130 may be placed on a vacuum table 128 and the location of the first layup tool 130 relative to the vacuum table 128 may be registered and/or recorded. In particular, the first longitudinal distance indicium 136 and the second longitudinal distance indicium 138 may be located relative to the front side of the vacuum table 128. Next, any necessary and/or suitable pneumatic connections may be made between the first fold tool 130 and the vacuum table 128, vacuum tube 142, and/or vacuum pump 140 to selectively supply vacuum pressure to a portion of a top side of the first layup tool 130 via the above-described vacuum apertures 133 of the first layup tool 130. Next, the first material roll 132 may be moved into alignment with the first layup tool 130 so that the left and right sides of the first material roll 132 extend beyond the left and right lateral extents of the first concavity 134, respectively, but not beyond the left and right sides of the first layup tool 130, respectively.

Figure 3:
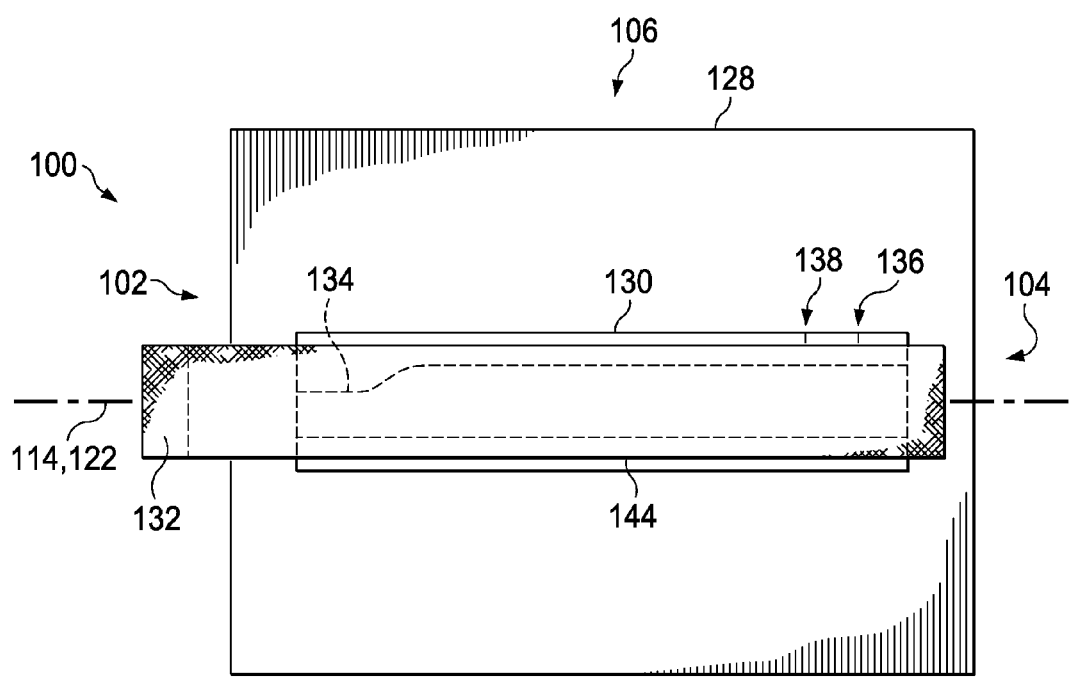
FIG. 3 is an orthogonal top view of the composite construction system of FIG. 2 showing a first material strip stretched over a layup tool.

Referring now to FIG. 3, an orthogonal top view of the CCS 100 is shown with a first material strip 144 extended vertically above the first concavity 134 of the first layup tool 130. In this embodiment, the first material strip 144 may be extended beyond a rear side of the first layup tool 130 and may be laterally aligned so that the left and right sides of the first material strip 144 extend beyond the left and right lateral extents of the first concavity 134, respectively, but not beyond the left and right sides of the first layup tool 130, respectively.

In some embodiments, the above-described method of constructing the first composite component 166 (see FIGS. 12 and 13) may progress by longitudinally dispensing a first material strip 144 from the first material roll 132 so that a rear end of the first material strip 144 lies longitudinally beyond the rear end of the first layup tool 130 while the first material strip 144 is located vertically above the first concavity 134.

Figure 4:
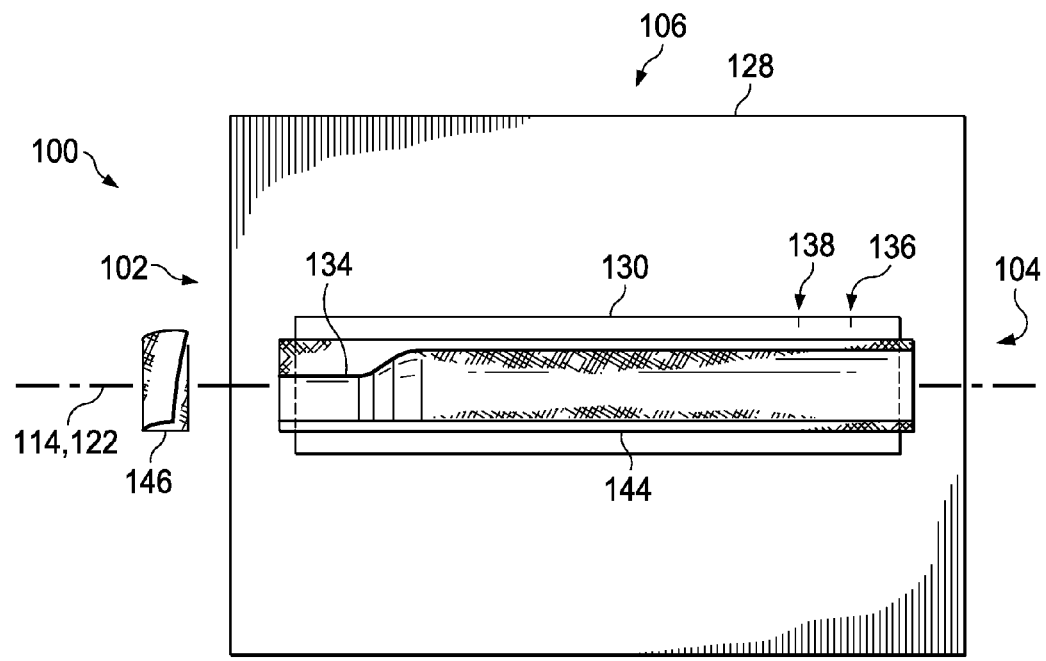
FIG. 4 is an orthogonal top view of the composite construction system of FIG. 2 showing the first material strip cut from a first material roll and pressed into a concavity of the layup tool.

Referring now to FIG. 4, an orthogonal top view of the CCS 100 is shown with the first material strip 144 separated from the first material roll 132 and with the first material strip 144 pressed into abutment with the first concavity 134 of the first layup tool 130. In alternative embodiments, the first material strip 144 may comprise an adhesive property on at least a portion of the bottom side so that the first material strip 144 is at least temporarily adhered to the first layup tool 130. The vertically abutted first material strip 144 may extend longitudinally beyond the front and rear sides of the first layup tool 130 and may extend beyond the left and right lateral extents of the first concavity 134, respectively. A second material roll 146 is also shown.

In some embodiments, the above-described method of constructing the first composite component 166 (see FIGS. 12 and 13) may progress by separating the first material strip 144 from the first material roll 132. Next, the first material strip 144 may be brought into vertical abutment with the first concavity 134. In this embodiment, the first material strip 144 may be held against the first layup tool 130. In other embodiments, the first material strip 144 may comprise an adhesive property that at least temporarily secures the first material strip 144 to the first concavity 134. Next, a second material roll 146 may be moved in to alignment with the first layup tool 130 so that the left and right sides of the second material roll 146 extend beyond the left and right lateral extents of the first concavity 134, respectively.

Figure 5:
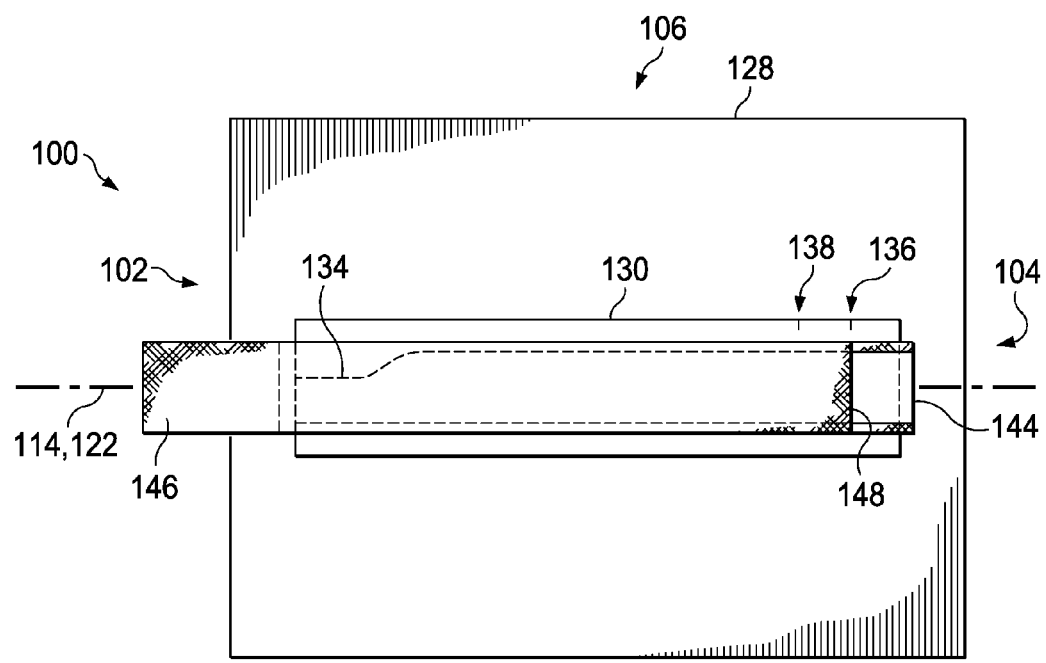
FIG. 5 is an orthogonal top view of the composite construction system of FIG. 2 showing a second material strip stretched over a layup tool.

Referring now to FIG. 5, an orthogonal top view of the CCS 100 is shown with a second material strip 148 extended vertically above the first concavity 134 of the first layup tool 130 and above the first material strip 144. In this embodiment, the second material strip 148 may be extended into longitudinal alignment with the first longitudinal distance indicium 136 may be laterally aligned so that the left and right sides of the second material strip 148 extend beyond the left and right lateral extents of the first concavity 134, respectively, but not beyond the left and right sides of the first layup tool 130, respectively.

In some embodiments, the above-described method of constructing the first composite component 166 (see FIGS. 12 and 13) may progress by longitudinally dispensing a second material strip 148 from the second material roll 146 so that a rear end of the second material strip 148 lies longitudinally aligned with the first longitudinal distance indicium 136. In this embodiment, the indicium is carried by the first layup tool 130. However, in alternative embodiments, the CCS 100 may comprise no indicia and the second material strip 148 may simply be dispensed out to a predetermined longitudinal distance relative to a front side of the first layup tool 130 while the second material strip 148 is located vertically above the first concavity 134 and the first material strip 144.

Figure 6:
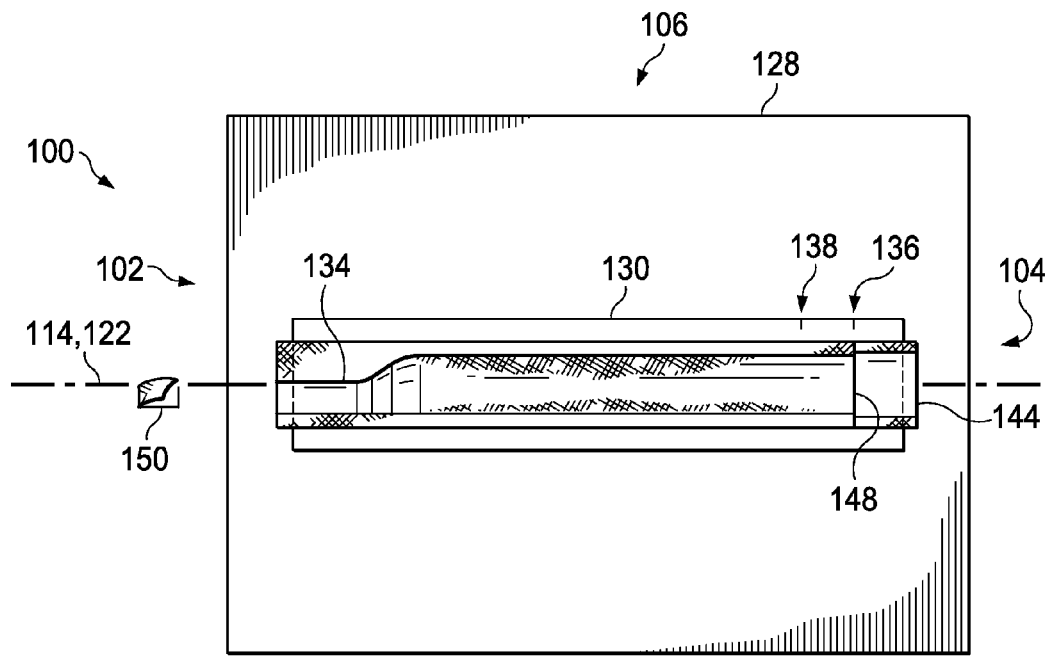
FIG. 6 is an orthogonal top view of the composite construction system of FIG. 2 showing the second material strip cut from a second material roll and pressed onto the first material strip and into the concavity of the layup tool.

Referring now to FIG. 6, an orthogonal top view of the CCS 100 is shown with the second material strip 148 separated from the second material roll 146 and with the second material strip 148 pressed into abutment with the first material strip 144 along the surface contours of the first concavity 134 of the first layup tool 130 as altered by the attached first material strip 144. In this embodiment, the second material strip 148 may comprise an adhesive property on at least a portion of the bottom side so that the second material strip 148 is at least temporarily adhered to at least one of the first material strip 144 and the first layup tool 130. In alternative embodiments, the second material strip 148 may be spatially retained relative to the first layup tool 130. The vertically abutted second material strip 148 may extend longitudinally into alignment with the first longitudinal distance indicium 136, beyond the front side of the first layup tool 130, and beyond the left and right lateral extents of the first concavity 134, respectively, but not beyond the left and right sides of the first layup tool 130, respectively. A third material roll 150 is also shown.

In some embodiments, the above-described method of constructing the first composite component 166 (see FIGS. 12 and 13) may progress by separating the second material strip 148 from the second material roll 146. Next, the second material strip 148 may be brought into vertical abutment with the first concavity 134 and/or the first material strip 144. In this embodiment, the second material strip 148 may comprise an adhesive property that at least temporarily secures the second material strip 148 to the first concavity 134 and/or the first material strip 144. In other embodiments, the second material strip 148 may be held against the first layup tool 130 and/or the first material strip 144 layup tool. Next, a third material roll 150 may be moved in to alignment with the first layup tool 130 so that the left and right sides of the third material roll 150 may be laterally aligned so that the left and right sides of the third material roll 150 are inwardly offset from each of the left and right sides of the first concavity 134, respectively.

Figure 7:
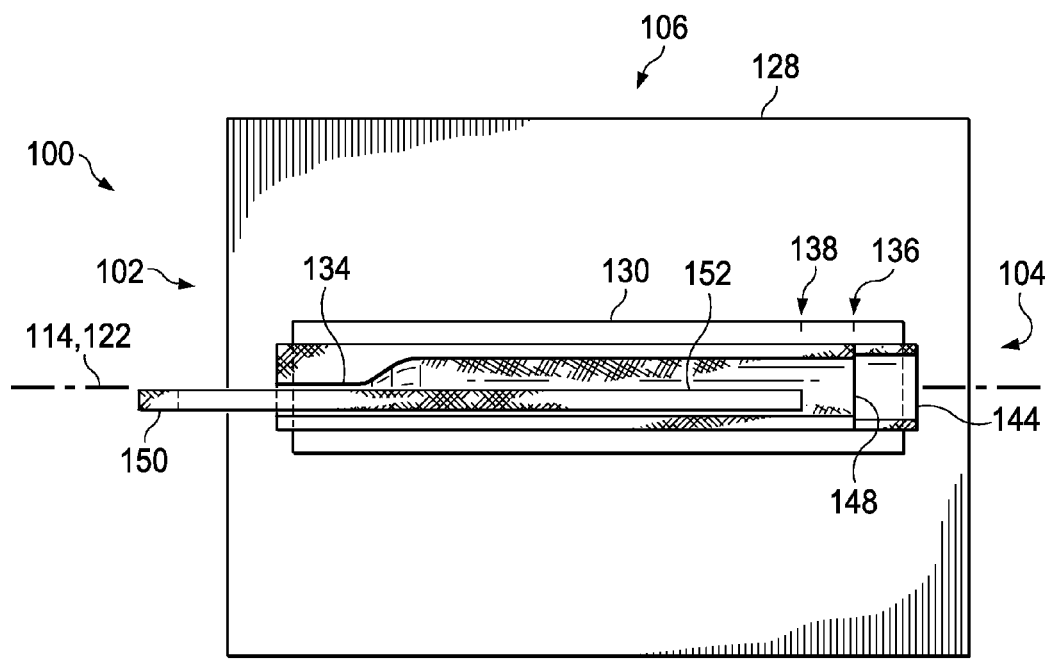
FIG. 7 is an orthogonal top view of the composite construction system of FIG. 2 showing a third material strip stretched over a layup tool.

Referring now to FIG. 7, an orthogonal top view of the CCS 100 is shown with a third material strip 152 extended vertically above the first concavity 134 of the first layup tool 130, above the first material strip 144, and above the second material strip 148. In this embodiment, the third material strip 152 may comprise a lateral width less than a lateral width of each of the first material strip 144 and second material strip 148. The third material strip 152 may be extended into longitudinal alignment with the second longitudinal distance indicium 138 and may be laterally aligned so that the left and right sides of the third material strip 152 are inwardly offset from each of the left and right sides, respectively, of the first material strip 144 and the second material strip 148. The third material strip 152 left and right lateral extents of the first concavity 134, respectively, but not beyond the left and right sides of the first layup tool 130, respectively.

In some embodiments, the above-described method of constructing the first composite component 166 (see FIGS. 12 and 13) may progress by longitudinally dispensing a third material strip 152 from the third material roll 150 so that a rear end of the third material strip 152 lies longitudinally aligned with the second longitudinal distance indicium 138. In this embodiment, the second longitudinal distance indicium 138 is carried by the first layup tool 130. However, in alternative embodiments, the CCS 100 may comprise no indicia and the third material strip 152 may simply be dispensed out to a predetermined longitudinal distance relative to a front side of the first layup tool 130 while the third material strip 152 is located vertically above the first concavity 134, the first material strip 144, and the second material strip 148.

Figure 8:
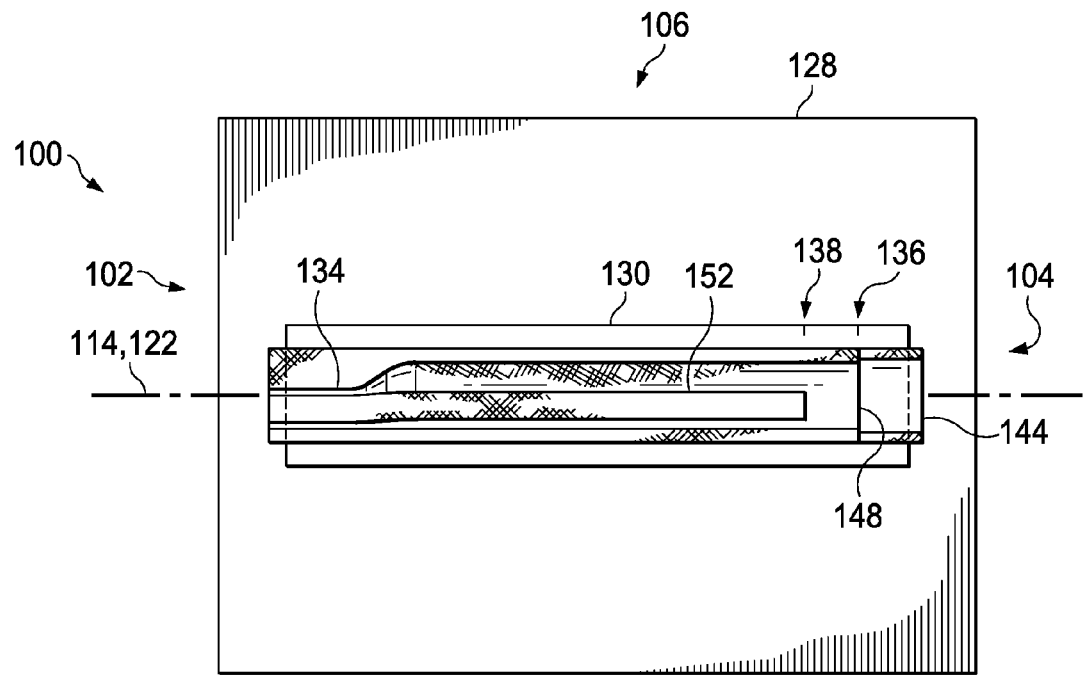
FIG. 8 is an orthogonal top view of the composite construction system of FIG. 2 showing the third material strip cut from a second material roll and pressed onto the second material strip and into the concavity of the layup tool.

Referring now to FIG. 8, an orthogonal top view of the CCS 100 is shown with the third material strip 152 separated from the third material roll 150 and with the third material strip 152 pressed into abutment with the second material strip 148 along the surface contours of the first concavity 134 of the first layup tool 130 as altered by the attached first material strip 144 and the second material strip 148. In this embodiment, the third material strip 152 may comprise an adhesive property on at least a portion of the bottom side so that the third material strip 152 is at least temporarily adhered to at least one of the second material strip 148, the first material strip 144, and the first layup tool 130. In alternative embodiments, the third material strip 152 may be spatially retained relative to the first layup tool 130. The vertically abutted third material strip 152 may extend longitudinally into alignment with the second longitudinal distance indicium 138, beyond the front side of the first layup tool 130, and may be laterally aligned so that the left and right sides of the third material strip 152 are inwardly offset from each of the left and right sides, respectively, of the first material strip 144 and the second material strip 148.

In some embodiments, the above-described method of constructing the first composite component 166 (see FIGS. 12 and 13) may progress by separating the third material strip 152 from the third material roll 150. Next, the third material strip 152 may be brought into vertical abutment with the first concavity 134, the first material strip 144, and/or the second material strip 148. In this embodiment, the third material strip 152 may comprise an adhesive property that at least temporarily secures the third material strip 152 to the first concavity 134, the first material strip 144, and/or the second material strip 148. In other embodiments, the third material strip 152 may be held against the first layup tool 130, the first material strip 144, and/or the second material strip 148.

In some embodiment, the above-described vertical abutment of one or more of the first material strip 144, second material strip 148, and third material strip 152 may cause the rear extent of one or more of the strips 144, 148, 152 to move longitudinally forward as a result of the strips 144, 148, 152 wrapping over a three-dimensional surface of the first concavity 134. In some embodiments, the differential in longitudinal distance between a dispensed alignment of the strips 144, 148, 152 with at least one of the indicia 136, 138 and vertically abutted and/or wrapped application of the strips 144, 148, 152 may be accounted for in predetermining the desired indicia 136, 138 offset distance from the front of the first layup tool 130. In other words, the strip 144, 148, 152 longitudinal lengths while dispensed may be selected after predetermining an amount of wrapping that may occur when the strips 144, 148, 152 are applied to the first concavity 134. More specifically, the location of the indicia 136, 138 may be selected as a function of a desired composite structure strength that is calculated based on at least one of the type of material strip 144, 148, 152 material and the anticipated geometry of the material strips 144, 148, 152 when applied in the above-described manner. In alternative embodiments, a composite structure may comprise more or fewer than three material strips.

Figure 9:
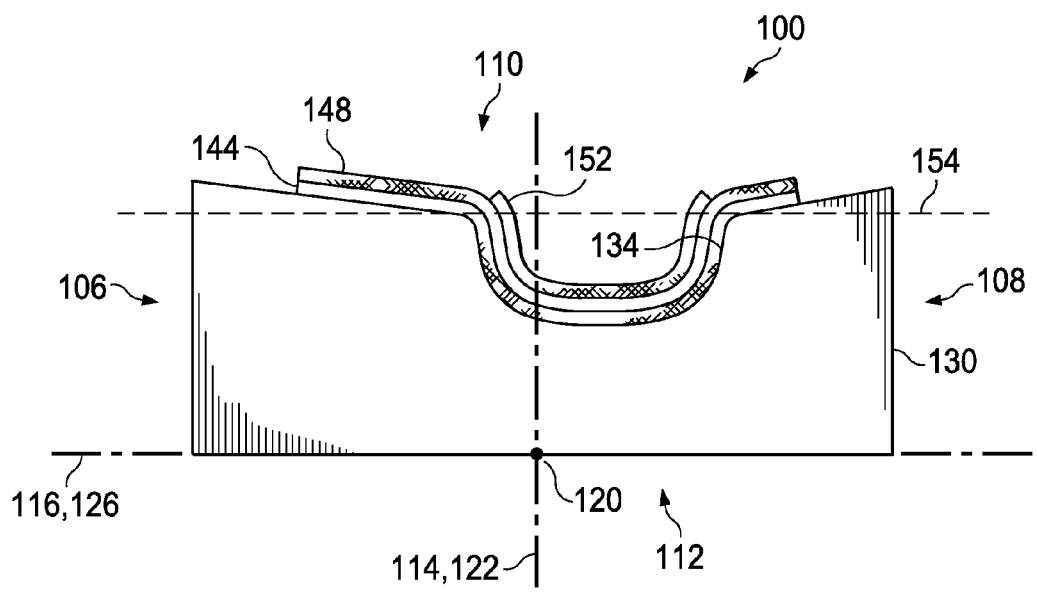
FIG. 9 is an orthogonal front view of the composite construction system of FIG. 2 showing the first material strip, second material strip, and third material strip pressed into the concavity of the layup tool.

Referring now to FIG. 9, an orthogonal front view of the CCS 100 of FIG. 2 showing the first material strip 144, second material strip 148, and third material strip 152 successively vertically abutted with the first concavity 134 of the first layup tool 130. A parting surface profile 154 is also shown. In this embodiment, the parting surface profile 154 may comprise a line generally parallel to the lateral axis 116 and vertically above the lateral axis 116. In this embodiment, the portions of the first material strip 144, second material strip 148, and third material strip 152 extending vertically above the parting surface profile 154 may be designated as material intended for removal. In this embodiment, some of each of the first material strip 144, second material strip 148, and third material strip 152 extend vertically above the parting surface profile 154. However, in alternative embodiments, some material strips may not extend vertically above the parting surface profile 154.

In some embodiments, the above-described method of constructing the first composite component 166 (see FIGS. 12 and 13) may progress by, after the strips 144, 148, 152 are applied to the first layup tool 130 as described above, curing the strips 144, 148, 152 in an autoclave and/or otherwise hardening and securing them relative to each other. In some embodiments, the strips 144, 148, 152 may remain on the first layup tool 130 during curing while in other embodiments the strips 144, 148, 152 may be removed from the first layup tool 130 prior to curing. In this embodiment, the strips 144, 148, 152 remain in place relative to the first layup tool 130 during curing. In some embodiments, the strips 144, 148, 152 may be inspected using non-destructive evaluation techniques. After curing the strips 144, 148, 152, the strips 144, 148, 152 may be removed from the first layup tool 130 and transferred to a first machining tool 131 (see FIGS. 10 and 11)

Figure 10:
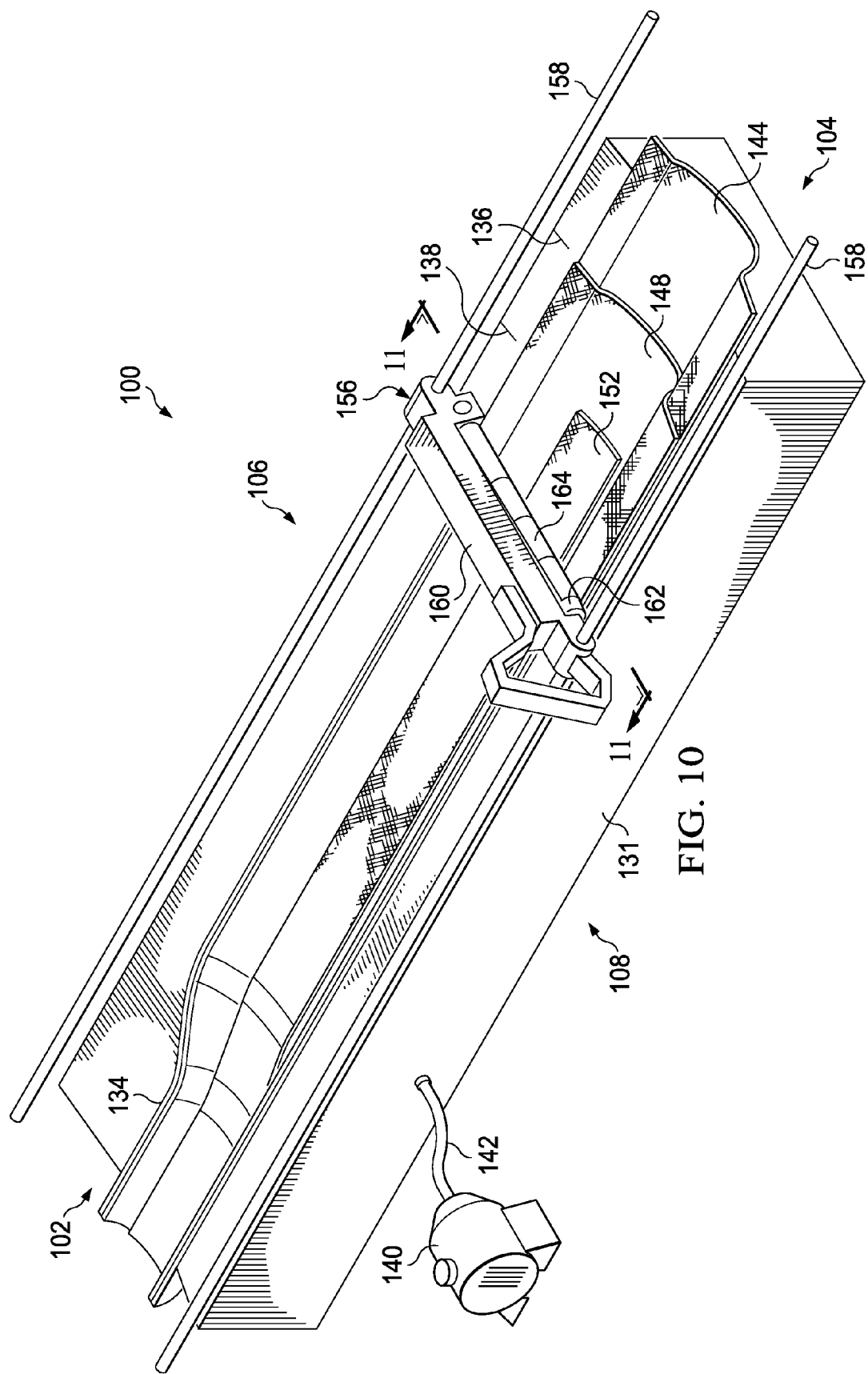
FIG. 10 is an oblique top-rear-right view of the composite construction system of FIG. 2 showing a router and showing a portion of the first material strip, second material strip, and third material strip removed by the router.
Figure 11:
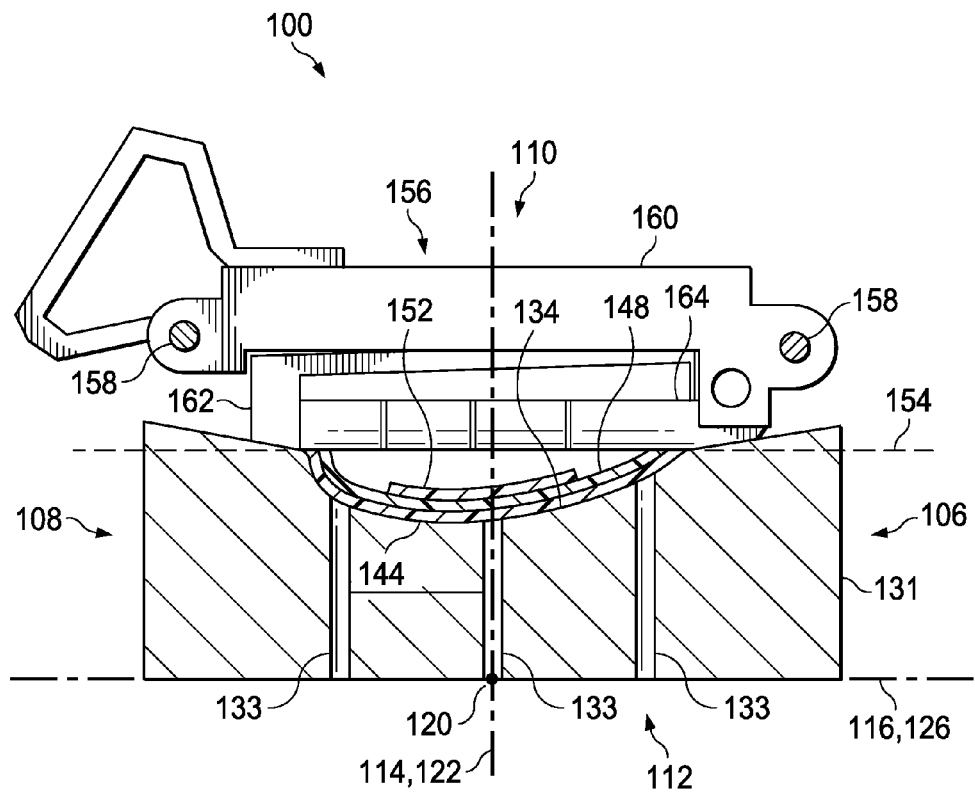
FIG. 11 is an orthogonal cut-away rear view of the composite construction system of FIG. 2 showing a router, a partially machined first material strip, a partially machined second material strip, and a partially machined third material strip.

Referring now to FIGS. 10 and 11, an oblique top-rear-right view and an orthogonal cut-away rear view of the CCS 100 show a router 156 along with partially machined first material strip 144, second material strip 148, and third material strip 152. The router 156 may generally comprise rails 158, a carrier 160, a head 162, and a bit assembly 164. The rails 158 may be located generally parallel to the longitudinal axis 114 and vertically above a first machining tool 131. The first machining tool 131 is substantially similar to first layup tool 130 but differs in that the first machining tool 131 may comprise one or more vacuum apertures 133 extending between the first concavity 134 and at least one of the front, rear, left, right, top, and bottom sides of the first layup tool 130. The vacuum apertures 133 may be in fluid communication with a vacuum pump 140 via a vacuum tube 142. The rails 158 are configured to selectively guide longitudinal displacement of the carrier 160. The carrier 160 is configured to carry a biased head 162 and the head 162 may generally be biased toward the first layup tool 130. The head 162 is configured to carry a bit assembly 164. In this embodiment, the bit assembly 164 may generally comprise a linear cutting profile substantially complementary to the parting surface profile 154. However, in alternative embodiments the bit assembly 164 may comprise any other cutting profile suitable for complementing any other suitable parting surface profile.

In some embodiments, the above-described method of constructing the first composite component 166 (see FIGS. 12 and 13) may progress by, after strips 144, 148, 152 are cured, geometrically registering and/or placing the router 156 relative to the first layup tool 130. Next, the router 156 may be selectively controlled to traverse a longitudinal path defined by the rails 158 beginning at the front of the first layup tool 130 and ending at the rear of the first layup tool 130. In some embodiments, the head 162 may be spring biased or otherwise downwardly biased to remain in contact with the portions of the strips 144, 148, 152 intended for removal by the router 156. Next, the bit assembly 164 may rotate in a clockwise direction as viewed orthogonally from the right, in a climb cut convention, so that the bit assembly 164 tends to pull the router 156 toward the rear of the first layup tool 130 and so that the bit assembly 164 tends to dig vertically downward into the material to be removed thus pressing the strip 144, 148, 152 against the machining tool 131 rather than pulling them away from the machining tool 131. In alternative embodiments, conventional cutting may be utilized so that the bit assembly 164 is rotated opposite to that described above. In some embodiments, the bit assembly may generally comprise a linear bit assembly profile that may vertically float relative to the first layup tool 130. In some embodiments, the router 156 may be a router. In some embodiments, the router 156 may generally remove material to form a chord line, chord plane, camber line, and/or camber surface of the first composite component 166, but in any case, to form a first mating interface 174. In some embodiments, by successively stacking the strips 144, 148, 152 to build a vertical stack and by subsequently machining the excess strip 144, 148, 152 material to create the first mating interface 174, the accuracy in which the exterior surfaces of the first composite component 166 can be high and can generally reduce the number of tolerance variables to include primarily (1) the tolerance with which the first material strip 144 may conform to the first concavity 134 and (2) the tolerance with which the router 156 may reliably remove material to form the first mating interface 174. After the above-described machining, the first composite component 166 may be removed from the first machining fixture 131 thereby completing the above-described method of constructing the first composite component 166 (see FIGS. 12 and 13).

Figure 12:
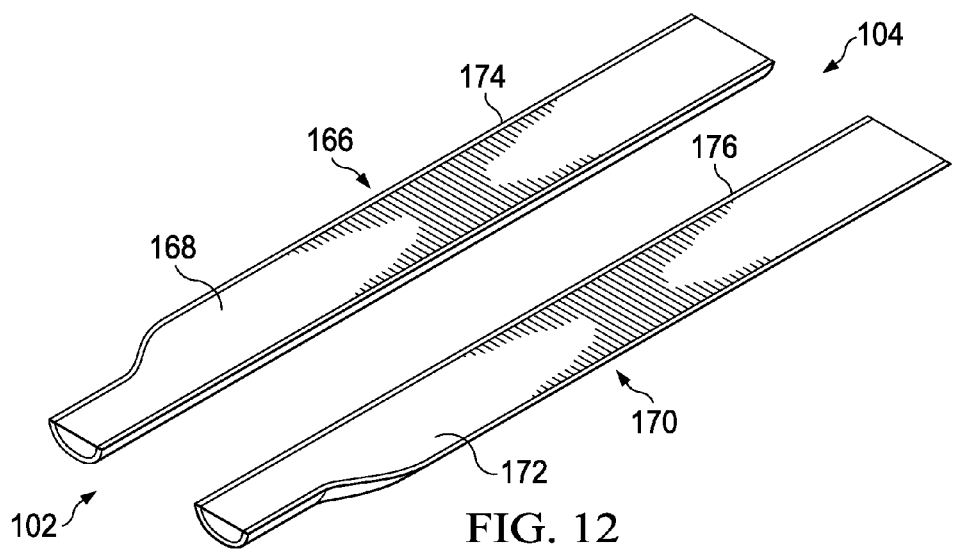
FIG. 12 is an oblique view of a first composite component comprising a core material and a complementary second composite component comprising a core material constructed by the composite construction system of FIG. 2.

Referring now to FIG. 12, an oblique view of a first composite component 166 comprising a first core material 168 and a complementary second composite component 170 comprising a second core material 172 is shown. In this embodiment, the first core material 168 may be sized and shaped to fill any remaining space within the first concavity 134 as well as vertically protrude from the first concavity 134. In some cases, the first core material 168 may be cut and/or machined to complement the shape and/or contours of the strips 144, 148, 152. In some cases, the first core material 168 may be warp banded into place against the strips 144, 148, 152 within the first concavity 134. The first composite component 166 may be constructed using the CCS 100 of FIGS. 2-11 while the second composite component 170 may be constructed using the CCS 100, but utilizing a second layup tool that is complementary to the first layup tool 130 rather than using the first layup tool 130. The first composite component 166 may generally comprise the first material strip 144, second material strip 148, and third material strip 152 as cured and/or removed from the first layup tool 130. The first core material 168 and the second core material 172 may comprise a nomex and/or honeycomb core material comprised of metal, paper, fiberglass, and/or any other suitable core material. The first composite component 166 generally comprises a first mating interface 174 and the second composite component 170 generally comprises a second mating interface 176. The first mating interface 174 and the second mating interface 176 generally geometrically complement each other and are configured for abutment to each other. In some embodiments, the core materials 168, 172 and/or the first and/or second composite components 166, 170 may be formed or machined to receive balancing weights and/or adjustable balancing devices.

Figure 13:
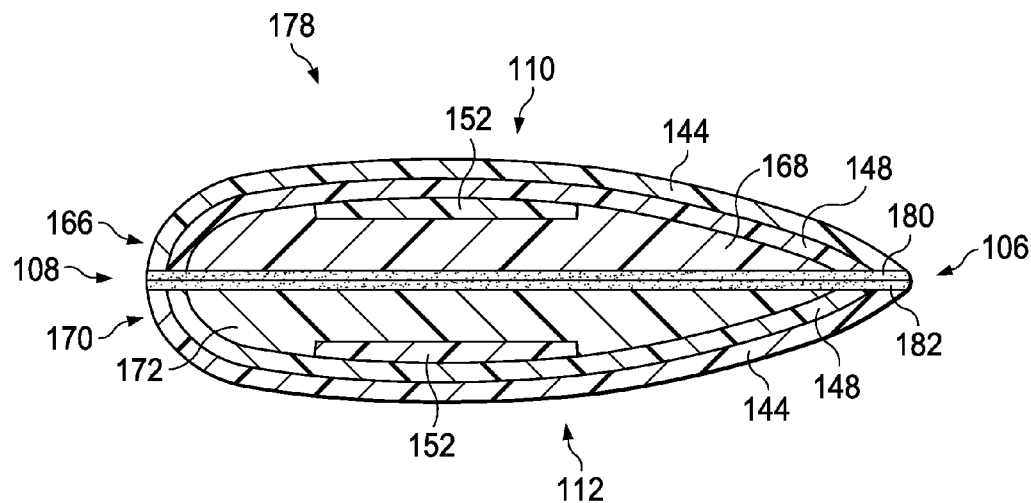
FIG. 13 is an orthogonal cut-away front view of a composite blade comprising the first composite component and the second composite component joined by a first structural adhesive and a second structural adhesive.

Referring now to FIG. 13, an orthogonal cut-away front view of a composite blade 178 is shown. The composite blade 178 comprises the first composite component 166 and the second composite component 170 joined together via the first mating interface 174 and the second mating interface 176. In this embodiment, the first mating interface 174 and the second mating interface 176 comprise a first structurally reinforced adhesive 180 and a second structurally reinforced adhesive 182, respectively. The first structurally reinforced adhesive 180 and the second structurally reinforced adhesive 182 may generally comprise a sheet of material that extends over the entire top side of the first composite component 166 and second composite component 170. In this embodiment, the structurally reinforced adhesives 180, 182 comprise a structural thin film adhesive comprising structural fiber in the ply of the adhesive.

Referring now to FIGS. 12 and 13, a method of constructing a composite blade 178 may comprise the above-described method of constructing the first composite component 166 as well as performing substantially the same method to construct a second composite component 170 using a second layup tool that is complementary to the first layup tool 130. The method of constructing a composite blade 178 may further comprise inserting a first core material 168 into a concavity of the first composite component 166 and inserting a second core material 172 into a concavity of the second composite component 170. In some embodiments, the core material 168, 172 may comprise nomex and in some embodiments any remaining unfilled space of the concavities may be filled with another material, such as a closed cell polymer foam. In some embodiments, the addition of the core material 168, 172 may be made prior to machining so that the router 156 may additionally form the mating interfaces 174, 176 not only in the skins 144, 148, 152, but also in the core materials 168, 172. In some embodiments, structural adhesives 180, 182 may be applied to the mating interfaces 174, 176. In some embodiments, the structural adhesives 180, 182 may provide structural stiffness to the core materials 168, 172. Next, the complementary mating interfaces 174, 176 may be caused to face each other and thereafter brought into abutment with each other, in some cases, with the structural adhesives 180, 182 therebetween, to form the composite blade 178. Next, the composite blade 178 may be cured in an autoclave and/or via any other suitable curing process. In some cases, torque wraps and/or abrasion strips may be applied to the composite blade 178 before and/or after the above-described curing process.

Figure 14:
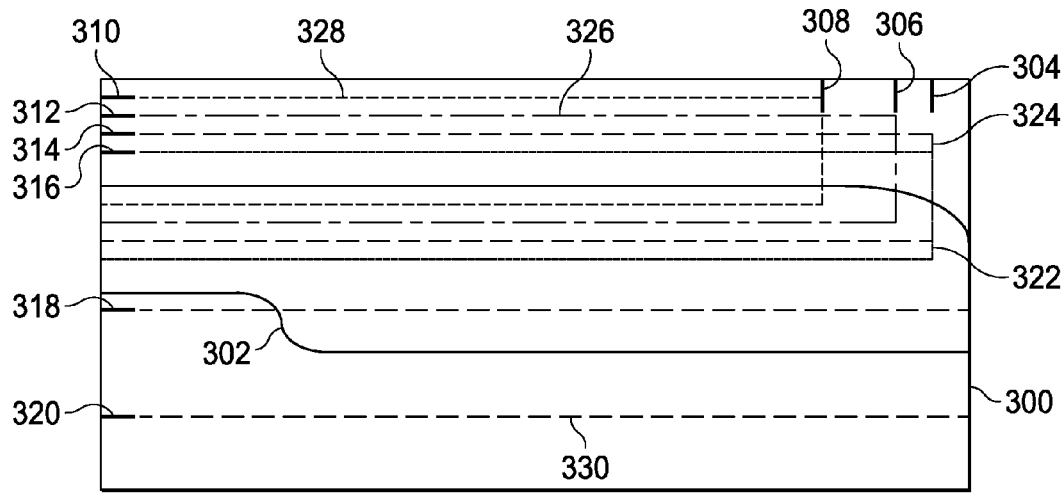
FIG. 14 is an orthogonal top view of a layup tool according to another embodiment of the disclosure.

Referring now to FIG. 14, an orthogonal top view of a layup tool 300 according to an embodiment of the disclosure is shown. The layup tool 300 comprises a concavity 302 and is substantially similar to the layup tool 130 but comprises both longitudinal and lateral indicia. More specifically, the layup tool 300 comprises a first longitudinal indicium 304, a second longitudinal indicium 306, a third longitudinal indicium 308, a first lateral indicium 310, a second lateral indicium 312, a third lateral indicium 314, a fourth lateral indicium 316, a fifth lateral indicium 318, and a sixth lateral indicium 320. Layup tool 300 is well suited for use in constructing composite structures that comprise complex distributions of composite material. For example, while composite blade 178 of FIG. 13 comprises relatively uniform distribution of the material strips and core material, by strategically placing individual material strips and/or portions of material strips in the concavity 302, complex distributions of composite material is possible even when using a single material roll. In some cases, a single material roll may be used to provide a first material strip 322, a second material strip 324, a third material strip 326, a fourth material strip 328, and a fifth material strip 330. In some cases, the first material strip 322 may be placed in the concavity 302 in alignment with both the first longitudinal indicium 304 and the fourth lateral indicium 316, the second material strip 324 may be placed in the concavity 302 in alignment with both the first longitudinal indicium 304 and the third lateral indicium 314, the third material strip 326 may be placed in the concavity 302 in alignment with both the second longitudinal indicium 306 and the second longitudinal indicium 312, and the fourth material strip 328 may be placed in the concavity 302 in alignment with both the third longitudinal indicium 308 and the first lateral indicium 310. In some cases, the fifth material strip 330 may be placed in the concavity 302 with one lateral edges of the fifth material strip 330 in alignment with the fifth lateral indicium 318 and the opposing lateral edge of the fifth material strip 330 in alignment with the sixth lateral indicium 320.

Figure 15:
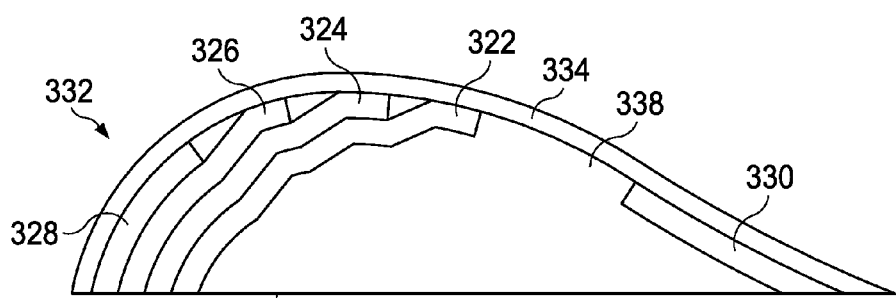
FIG. 15 is an orthogonal cut-away view of a composite structure according to an embodiment of the disclosure that may be generated using the layup tool of FIG. 14.

Referring now to FIG. 15, an orthogonal cut-away view of a composite component 332 according to an embodiment of the disclosure is shown. The composite component 332 comprises the first material strip 322, a second material strip 324, a third material strip 326, a fourth material strip 328, and a fifth material strip 330 as placed in accordance with the discussion of FIG. 13 above. The composite component 332 may further comprise a skin layer 334 a structurally reinforced adhesive 336 and a core material 338.

The systems and methods disclosed above may be used to create a composite component in an inexpensive manner and optionally without relatively high technology tools and/or devices. Specifically, systems and methods may generally utilize a layup tool, one or more material rolls, a machining tool, and a router to form a composite component such as an outer skin and/or aerodynamic faring for an aircraft blade. Further, the systems and methods may utilize a core material and a structurally reinforced adhesive to fill and/or stabilize the composite component. In some embodiments the router may be utilized to form a mating interface for subsequent mating to a complementary structure. In some embodiments, the methods disclosed may comprise no use of laser and/or other visual projection of material strips, no need for gerber cutting or other complicated cutting of material strips and/or ply packs, no pattern flattening, and/or no 3-axis milling of material strips and/or ply packs.

It will be appreciated that while a vacuum table 128 and associated components are disclosed above, in alternative embodiments, any other suitable device for holding the composite components during the above-described machining may be utilized. Further, while the embodiments above comprised only two longitudinal indicia for use in placing three material strips, in alternative embodiments, additional indicia may be provided to aid in placing more material strips and/or lateral indicia may be provided to similarly aid in lateral placement of material strips. In some embodiments, the indicia may comprise a ruler, a series of evenly spaced marks, and/or any other suitable measurement device and/or methodology. In some embodiments, multiple material strips may be removed from a material roll and placed on a layup tool using one or more indicia so that any number of strips may be applied using any number of indicia.

The systems and methods disclosed herein may be utilized in all forms of resin transfer molding, wet composite material layup, and/or other types of composite manufacture. In some embodiments, a single material roll may be used to supply material strips that are cut and placed on a layup tool using indicia suitably located to provide the material strips with differing lateral (chordwise) drop off or termination locations. Accordingly, this disclosure provides systems and methods that may be configured to construct a composite structure comprising cured material strips of varying chord length wherein the material strips were provided from a single material roll. In alternative embodiments, the machining may be performed by a cutting tool carried by a duplicating device that moves the cutting tool as a function of a separately provided master three dimensional surface. For example, movement of the cutting tool may be controlled by operating a three-dimensional polygraph device that traces a master three dimensional surface and moves the cutting tool as a function of the master three dimensional surface.

In some embodiments, successively laying a plurality of material strips comprising different lateral widths and/or directional fiber orientations in locations consistent with longitudinal and/or lateral indicia may facilitate the generation of a final piece of complex composite layup without the use of laser projection and/or overly complex machinery. In some embodiments, the above-described machining may be performed on uncured and/or partially cured material strips. In some embodiments, while a machining process may be assumed to generate at least one of a chord line of a composite component, a chord plane of a composite component, a camber line of a composite component, and a camber surface of the composite component, because of variations and/or tolerances in machining and/or because of post-machining alterations to the composite structure, the actual chord line, chord plane, camber line, and/or camber surface may not solely defined by the machining process, but rather, substantially influenced by the machining. In some embodiments, material strips may be machined at the same time as core material while in other embodiments material strips may be machined separately from machining the core material. Further, while the above-described embodiments primarily disclose longitudinally extending material strips from a material roll located near a longitudinal end of a layup tool, in alternative embodiments, substantially similar material strip extension and/or material strip alignment may be accomplished by extending material strips from a material roll located near a lateral end of a layup tool, and/or from any other direction relative to the layup tool.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent. Of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method of constructing a composite component, comprising:
    longitudinally aligning each of a plurality of material strips relative to a concavity of a layup tool, wherein each of the plurality of material strips is substantially rectangular;
    longitudinally extending the material strip to a predetermined location relative to the layup tool by:
       measuring a longitudinal distance of each of the plurality of material strips, and aligning a longitudinal end of at least one of the plurality of material strips with a longitudinal distance indicium;
    vertically abutting each of the plurality of material strips to the concavity of the layup tool to form a stack of material strips; and
    machining the stack of material strips using a router traversing longitudinally over the stack of material strips and using a bit assembly rotating in a direction causing the router to be pulled toward a rear of the layup tool.

2. The method of claim 1, further comprising curing the stack of material strips prior to machining the stack of material strips.

3. The method of claim 1, wherein machining the stack of material strips comprises machining the stack of material strips to produce at least one of a chord line of the composite component, a chord plane of the composite component, a camber line of the composite component, and a camber surface of the composite component.

4. The method of claim 1, further comprising abutting a core material to the stack of material strips.

5. The method of claim 4, further comprising machining the core material to produce at least one of a chord line of the composite component, a chord plane of the composite component, a camber line of the composite component, and a camber surface of the composite component.

6. The method of claim 4, further comprising abutting a structurally reinforced adhesive to the core material.

7. The method of claim 4, wherein at least one additional material strip is provided between the stack of material strips and the core material.

8. The method of claim 7, wherein the stack of material strips and the at least one additional material strip are cured prior to abutting the core material.

9. The method of claim 8, further comprising:
    creating an additional composite component that is configured to have at least one of a chord line, a chord plane, a camber line, and a camber surface that is complementary to the at least one of the composite component chord line, a chord plane, a camber line, and a camber surface, respectively; and
    joining the composite component and the additional composite component along the at least one complementary chord line, a chord plane, a camber line, and a camber surface.

10. A method of constructing a composite component, the method comprising:
    extending a first material strip above a concavity formed in a layup tool, the first material strip extending beyond longitudinal extents and lateral extents of the concavity;
    vertically abutting the first material strip with the concavity;
    extending a second material strip above the first material strip, the second material strip extending within the longitudinal extents and beyond the lateral extents of the concavity;
    vertically abutting the second material strip with the concavity;
    extending a third material strip above the second material strip, the third material strip extending within longitudinal extents of the second material strip and within the lateral extents of the concavity;
    vertically abutting the third material strip; and
    machining a stack of the first material strip, the second material strip and the third material strip to construct the composite component using a router traversing longitudinally over the stack of material strips and using a bit assembly rotating in a direction causing the router to be pulled toward a rear of the layup tool.

11. The method of claim 10, wherein machining the stack to construct the composite component comprises machining the stack to produce at least one of a chord line of the composite component, a chord plane of the composite component, a camber line of the composite component, and a camber surface of the composite component.

12. The method of claim 10, wherein extending the second material strip above the first material strip comprises extending the second material strip to a first longitudinal indicium formed in the layup tool within the longitudinal extents of the concavity.

13. The method of claim 12, wherein extending the third material strip within the longitudinal extents of the second material strip comprises extending the second material strip to a second longitudinal indicium formed in the layup tool at a location before a location of the first longitudinal indicium.

14. The method of claim 10, further comprising, prior to machining:
- curing the stack of the first material strip, the second material strip and the third material strip; and
- transferring the stack to a machining tool configured to machine the stack to construct the composite component.

* * * * *